United States Patent
Osajima

(10) Patent No.: US 12,158,847 B2
(45) Date of Patent: Dec. 3, 2024

(54) CONTROL DEVICE, CONTROL METHOD, RECORDING MEDIUM IN WHICH CONTROL PROGRAM IS RECORDED, AND VEHICLE

(71) Applicant: TOYOTA JIDOSHA KABUSHIKI KAISHA, Toyota (JP)

(72) Inventor: Takayuki Osajima, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 18 days.

(21) Appl. No.: 18/165,418

(22) Filed: Feb. 7, 2023

(65) Prior Publication Data

US 2023/0259302 A1    Aug. 17, 2023

(30) Foreign Application Priority Data

Feb. 16, 2022    (JP) .................................. 2022-022461

(51) Int. Cl.
| | |
|---|---|
| G06F 12/00 | (2006.01) |
| G06F 3/06 | (2006.01) |
| G06F 13/16 | (2006.01) |
| G06F 13/18 | (2006.01) |

(52) U.S. Cl.
CPC ........ *G06F 13/1605* (2013.01); *G06F 3/0604* (2013.01); *G06F 3/0655* (2013.01); *G06F 3/0679* (2013.01); *G06F 13/18* (2013.01)

(58) Field of Classification Search
None
See application file for complete search history.

(56) References Cited

U.S. PATENT DOCUMENTS

| | | | |
|---|---|---|---|
| 7,209,992 B2 | 4/2007 | Macinnis et al. | |
| 9,928,183 B2* | 3/2018 | Svendsen | G06F 13/18 |
| 2009/0216917 A1 | 8/2009 | Shasha et al. | |
| 2016/0352889 A1* | 12/2016 | Kumabe | H04L 13/08 |
| 2021/0089478 A1 | 3/2021 | Takeda et al. | |
| 2022/0269546 A1 | 8/2022 | Osajima | |
| 2023/0066427 A1* | 3/2023 | Aigner | H04L 9/3263 |

FOREIGN PATENT DOCUMENTS

| | | |
|---|---|---|
| JP | 2013161242 A | 8/2013 |
| JP | 2019144910 A | 8/2019 |
| JP | 2021051420 A | 4/2021 |

* cited by examiner

*Primary Examiner* — Daniel D Tsui
(74) *Attorney, Agent, or Firm* — Dickinson Wright, PLLC

(57) ABSTRACT

A control device receives data output from plural applications. The control device arbitrates, based on predetermined conditions, the order in which the plural sets of data output from the plural applications are stored in a storage.

11 Claims, 7 Drawing Sheets

FIG.4

| VEHICLE STATE | FIRST PRIORITY | SECOND PRIORITY | THIRD PRIORITY | FOURTH PRIORITY | FIFTH PRIORITY | SIXTH PRIORITY | SEVENTH PRIORITY |
|---|---|---|---|---|---|---|---|
| AUTONOMOUS DRIVING MODE | AUTONOMOUS DRIVING APPLICATION 60B (READING OF EXECUTION DATA) | AUTONOMOUS DRIVING APPLICATION 60B (WRITING OF EXECUTION DATA) | CONTROL APPLICATION 60A (READING OF EXECUTION DATA) | CONTROL APPLICATION 60A (WRITING OF EXECUTION DATA) | MULTIMEDIA APPLICATION 60C (READING OF EXECUTION DATA) | MULTIMEDIA APPLICATION 60C (WRITING OF EXECUTION DATA) | WRITING OF KEY DATA |
| VEHICLE SHOP MODE | WRITING OF KEY DATA | WRITING OF EXECUTION DATA | READING OF EXECUTION DATA | ... | ... | ... | ... |
| FAILURE MODE | ... | ... | ... | ... | ... | ... | ... |
| OTA MODE | ... | ... | ... | ... | ... | ... | ... |
| ... | ... | ... | ... | ... | ... | ... | ... |

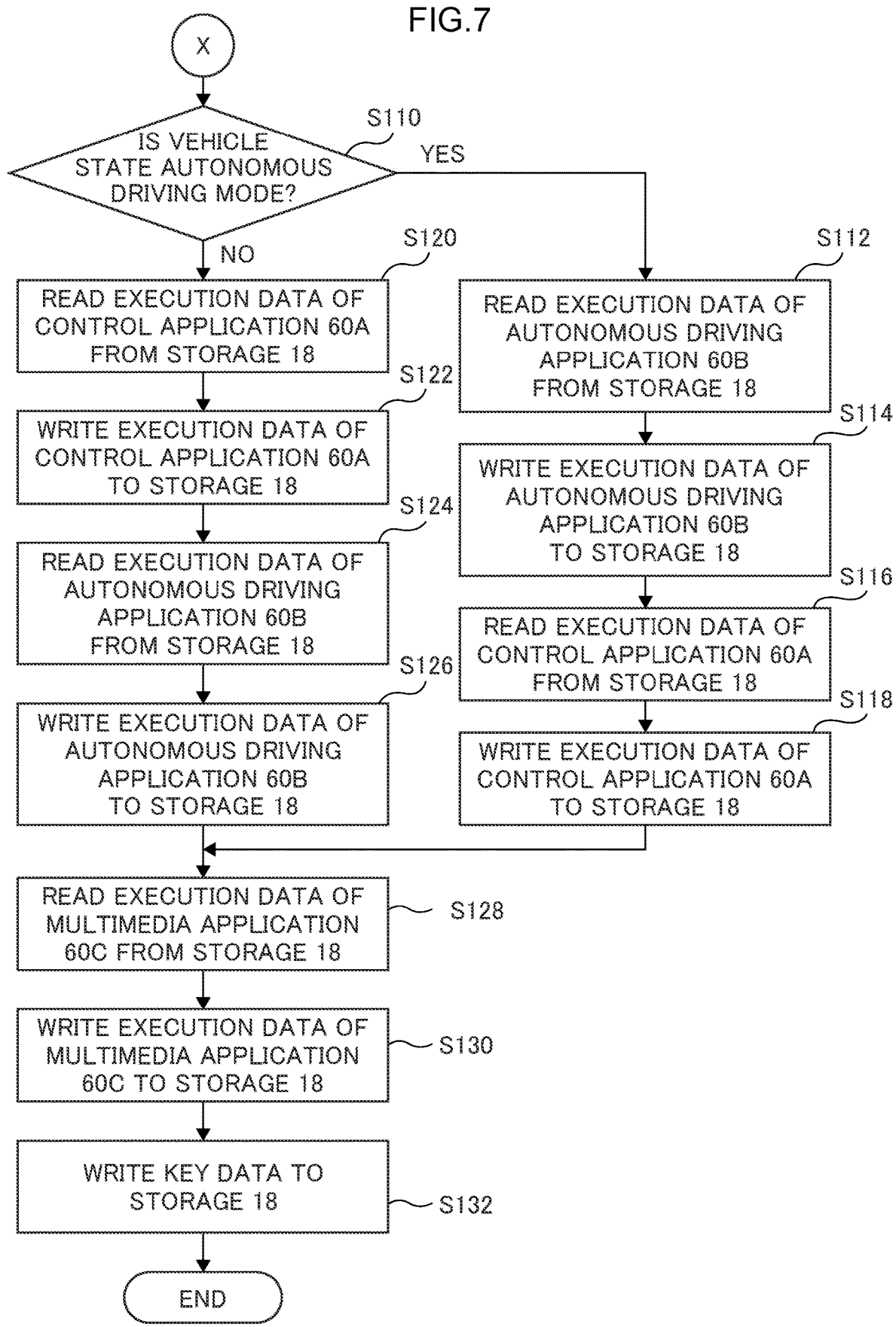

CONTROL DEVICE, CONTROL METHOD, RECORDING MEDIUM IN WHICH CONTROL PROGRAM IS RECORDED, AND VEHICLE

CROSS-REFERENCE TO RELATED APPLICATION

This application is based on and claims priority under 35 USC 119 from Japanese Patent Application No. 2022-022461 filed on Feb. 16, 2022, the disclosure of which is incorporated by reference herein.

BACKGROUND

Technical Field

The present disclosure relates to a control device, a control method, a recording medium in which a control program is recorded, and a vehicle.

Related Art

Conventionally, a virtualization support device is known which improves the efficiency with which a processor is utilized (e.g., Japanese Patent Application Laid-open (JP-A) No. 2021-051420). The processor disclosed in JP-A No. 2021-051420 executes arbitration of the order in which plural accelerators execute plural requests from first and second applications. The processor also controls settings of an input/output memory management unit using one of first and second information based on the arbitration and causes one or more corresponding accelerators of the plural accelerators to execute one of the plural requests based on the arbitration (e.g., see the abstract of JP-A No. 2021-051420).

In this connection, if plural devices (e.g., central processing units, or CPUs) that execute plural application software programs (hereinafter simply called "applications") try to access a storage unit such as a storage at substantially the same time to store data, sometimes the problem of arbitrating which device's data is to be prioritized and stored arises.

The technology of JP-A No. 2021-051420 arbitrates the order in which the plural accelerators execute the plural requests but does not arbitrate the order in which sets of data of the plural applications are stored in a storage unit such as a storage.

For this reason, the related art has the problem that when plural devices related to plural applications access one storage unit at substantially the same time, sometimes competition ends up occurring between the plural devices. There are also cases where, due to plural devices accessing one storage unit at substantially the same time, integrity when updating data, for example, ends up being lost.

The present disclosure has been made in consideration of the above circumstances, and it is an object thereof to inhibit, even in a case where plural devices related to plural applications access one storage unit, the occurrence of competition between the devices.

SUMMARY

A first aspect of the disclosure is a control device including: a reception unit that receives data output from plural applications; and an arbitration unit that arbitrates, based on predetermined conditions, an order in which plural sets of the data output from the plural applications are stored in a storage unit.

The control device of the first aspect of the disclosure receives the data output from the plural applications. The control device arbitrates, based on the predetermined conditions, an order in which plural sets of the data output from the plural applications are stored in the storage unit. Because of this, even in a case where plural devices related to the plural applications access one storage unit, the occurrence of competition between the devices can be inhibited.

The predetermined conditions of a second aspect of the disclosure are vehicle state conditions representing conditions that are preset in accordance with vehicle states, the reception unit further receives a vehicle state, and the arbitration unit arbitrates, based on the vehicle state and the vehicle state conditions, the order in which the plural sets of data received by the reception unit are stored in the storage unit. According to the second aspect of the disclosure, even in a case where plural devices related to the plural applications access one storage unit in accordance with the vehicle state of the vehicle in which the control device is installed, the occurrence of competition between the devices can be inhibited.

The plural applications of a third aspect of the disclosure include an autonomous driving application that is an application relating to autonomous driving control and a control application that is an application relating to vehicle control that is different from the autonomous driving control, the vehicle states include an autonomous driving mode indicating that the vehicle is in an autonomous driving state, and the meditation unit arbitrates the order in which the plural sets of data are stored in the storage unit in such a way that, in a case in which the vehicle state received by the reception unit is the autonomous driving mode, the arbitration unit prioritizes, and stores in the storage unit, data output from the autonomous driving application over data output from the control application and, in a case in which the vehicle state received by the reception unit is not the autonomous driving mode, the arbitration unit prioritizes, and stores in the storage unit, the data output from the control application over the data output from the autonomous driving application. According to the third aspect of the disclosure, the control device can appropriately arbitrate the order in which the data are stored in the storage unit in accordance with whether or not the vehicle state is the autonomous driving state.

The plural applications of a fourth aspect of the disclosure further include a multimedia application that is an application relating to multimedia utilized in the vehicle, and the arbitration unit arbitrates the order in which the plural sets of data are stored in the storage unit in such a way that, in a case in which the vehicle state received by the reception unit is the autonomous driving mode, the arbitration unit prioritizes, and stores in the storage unit, the data output from the autonomous driving application over the data output from the control application and the data output from the multimedia application and, in a case in which the vehicle state received by the reception unit is not the autonomous driving mode, the arbitration unit prioritizes, and stores in the storage unit, the data output from the control application and the data output from the autonomous driving application over the data output from the multimedia application. According to the fourth aspect of the disclosure, the control device can appropriately arbitrate the order in which the data are stored in the storage unit in accordance with whether or not the vehicle state is the autonomous driving mode and the type of the application.

The vehicle states of a fifth aspect of the disclosure include a vehicle shop mode indicating that the vehicle is in a service or repair shop and that the vehicle is being serviced or being repaired, and the arbitration unit arbitrates the order in which the plural sets of data are stored in the storage unit in such a way that, in a case in which the vehicle state received by the reception unit is the vehicle shop mode, the arbitration unit prioritizes, and stores in the storage unit, the data output from the control application over the data output from the autonomous driving application. According to the fifth aspect of the disclosure, the control device can appropriately arbitrate the order in which the data are stored in the storage unit in accordance with whether or not the vehicle state is the vehicle shop mode.

The arbitration unit of a sixth aspect of the disclosure further arbitrates the order in which the plural sets of data are stored in the storage unit and an order in which data are read from the storage unit in such a way that, in a case in which the vehicle state received by the reception unit is the vehicle shop mode, the arbitration unit prioritizes a process of storing the data output from the applications in the storage unit over a process of reading data from the storage unit and, in a case in which the vehicle state received by the reception unit is the autonomous driving mode, the arbitration unit prioritizes the process of reading data from the storage unit over the process of storing the data output from the applications in the storage unit. According to the sixth aspect of the disclosure, the control device can appropriately arbitrate between the process of storing data in the storage unit and the process of reading data from the storage unit in accordance with the type of process with respect to the data.

The data output from the plural applications of a seventh aspect of the disclosure include key data for encrypting the data output from the applications and execution data utilized when executing the applications, and the arbitration unit arbitrates, based on the predetermined conditions, which of the key data and the execution data to prioritize and store in the storage unit. According to the seventh aspect of the disclosure, the control device can appropriately arbitrate the process of storing data in the storage unit in accordance with the type of data.

The predetermined conditions of an eighth aspect of the disclosure are vehicle state conditions representing conditions that are preset in accordance with vehicle states, the reception unit further receives a vehicle state, the vehicle states include an autonomous driving mode indicating that the vehicle is in an autonomous driving state and a vehicle shop mode indicating that the vehicle is in a service or repair shop and that the vehicle is being serviced or being repaired, and the arbitration unit further arbitrates the order in which the plural sets of data are stored in the storage unit and an order in which data are read from the storage unit in such a way that, in a case in which the vehicle state received by the reception unit is the vehicle shop mode, the arbitration unit prioritizes a process of storing the key data in the storage unit over a process of storing the execution data in the storage unit and, in a case in which the vehicle state received by the reception unit is the autonomous driving mode, the arbitration unit prioritizes a process of reading the execution data from the storage unit over the process of storing the key data in the storage unit. According to the eighth aspect of the disclosure, the control device can appropriately arbitrate between the process of storing data in the storage unit and the process of reading data from the storage unit in accordance with the type of data and the type of process.

A ninth aspect of the disclosure is a vehicle including the above control device. According to the ninth aspect of the disclosure, as in the first aspect, even in a case where plural devices related to the plural applications access one storage unit, the occurrence of competition between the devices can be inhibited.

A control method of a tenth aspect of the disclosure is a control method whereby a computer executes a process to receive data output from plural applications and arbitrate, based on predetermined conditions, an order in which plural sets of the data output from the plural applications are stored in a storage unit. According to the tenth aspect of the disclosure, as in the first aspect, even in a case where plural devices related to the plural applications access one storage unit, the occurrence of competition between the devices can be inhibited.

A recording medium of an eleventh aspect of the disclosure is a recording medium in which is recorded a control program for causing a computer to execute a process to receive data output from plural applications and arbitrate, based on predetermined conditions, an order in which plural sets of the data output from the plural applications are stored in a storage unit. According to the eleventh aspect of the disclosure, as in the first aspect, even in a case where plural devices related to the plural applications access one storage unit, the occurrence of competition between the devices can be inhibited.

As described above, according to the present disclosure, there is obtained the advantageous effect that, even in a case where plural devices related to plural applications access one storage unit, the occurrence of competition between the devices can be inhibited.

BRIEF DESCRIPTION OF THE DRAWINGS

FIG. 4 is a diagram for describing an example of vehicle state conditions;

FIG. 7 is a flowchart showing an example of a flow of processes performed by the control system pertaining to the embodiment.

DETAILED DESCRIPTION

An embodiment of the disclosure will be described in detail below with reference to the drawings.

EMBODIMENT

Figure 1:
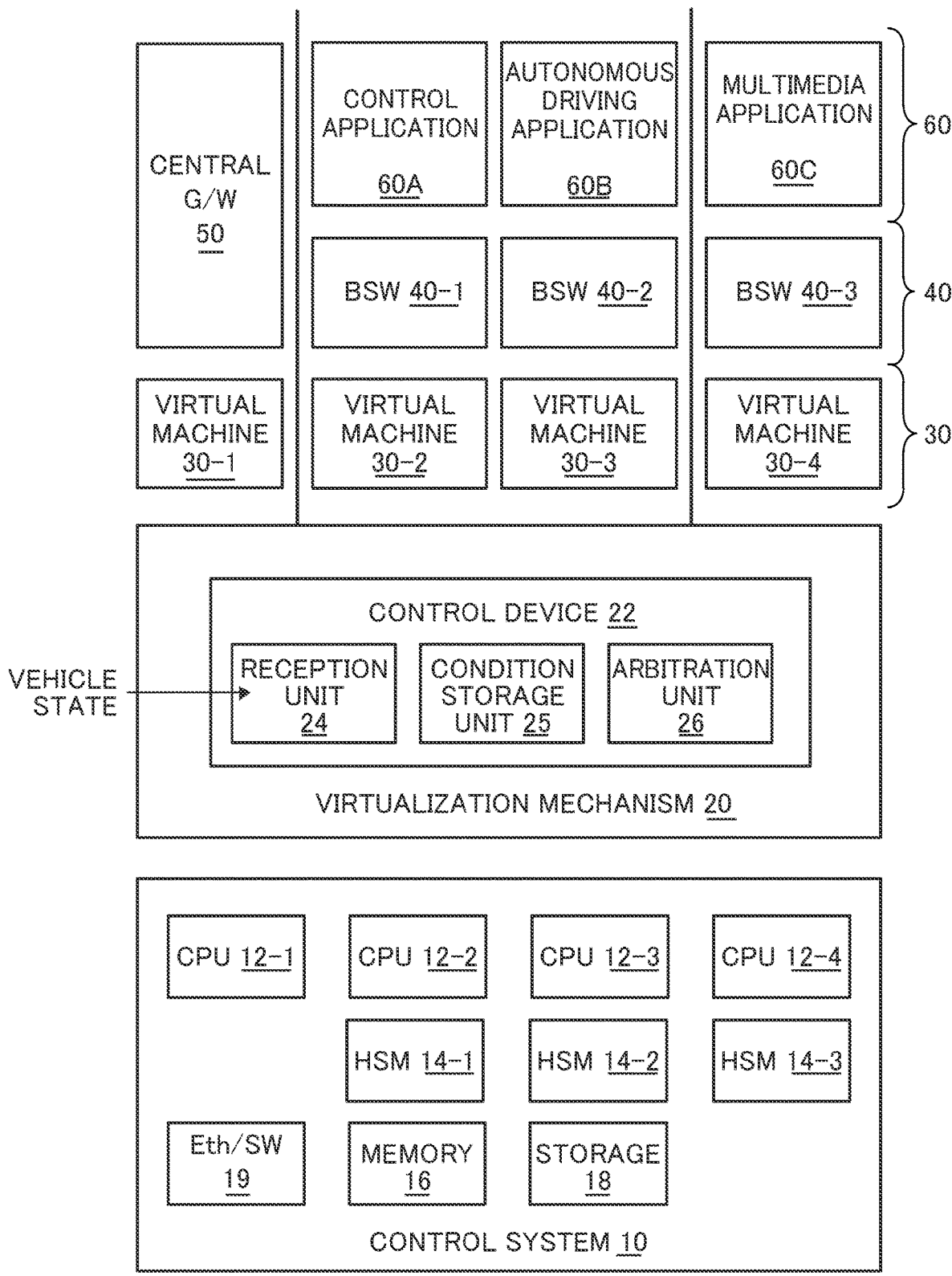
FIG. 1 is a block diagram showing an example of the schematic configuration of a control system pertaining to an embodiment.

FIG. 1 is a block diagram showing an example of the schematic configuration of a control system 10 pertaining to the embodiment. The control system 10, as shown in FIG. 1, includes plural central processing units (CPUs) 12-1, 12-2, 12-3, 12-4, plural hardware security modules (HSMs) 14-1, 14-2, 14-3, a memory 16 serving as a temporary storage space, a storage 18 that is an example of a nonvolatile storage unit, and an Ethernet (registered trademark) switch (Eth/SW) 19 that is a communication interface. The control system 10 is installed in a vehicle (not shown in the drawings).

The control system 10 is hardware in which various constituent elements described later are installed. The control system 10 is also a processor.

The plural CPUs 12-1, 12-2, 12-3, 12-4, the plural HSMs 14-1, 14-2, 14-3, the memory 16, the storage 18, and the Eth/SW 19 are communicably connected to each other via a bus (not shown in the drawings). It will be noted that in the following description any one of the plural CPUs 12-1, 12-2, 12-3, 12-4 will also simply be called "the CPU 12". Furthermore, in the following description any one of the plural HSMs 14-1, 14-2, 14-3 will also simply be called "the HSM 14".

The HSM 14 is hardware for managing key data used to encrypt or decrypt data. The HSM 14 has a security function and is tamper resistant. The HSM 14 retains key data, performs encryption or decryption operations using key data, generates key data, and generates random numbers.

The memory 16 is a storage device that can be directly accessed by the CPU 12 that is a processor. The memory 16 also temporarily stores frequently utilized data, so it is also an example of a storage unit.

The storage 18 is realized by a hard disk drive (HDD), a solid-state drive (SSD), or a flash memory, for example. The storage 18 is also an example of memory of the present disclosure. The storage 18, which serves as a storage medium, stores programs for allowing the control system 10 to function. The plural CPUs 12-1, 12-2, 12-3, 12-4 configuring the control system 10 read the various programs from the storage 18, load them to the memory 16, and sequentially execute processes that the programs have.

By sequentially executing the various programs, the plural CPUs 12-1, 12-2, 12-3, 12-4 of the control system 10 realize functions of a virtualization mechanism 20, plural virtual machines 30-1, 30-2, 30-3, 30-4, plural basic software (BSW) programs 40-1, 40-2, 40-3, a central gateway (G/W) 50, a control application 60A, an autonomous driving application 60B, and a multimedia application 60C, all shown in FIG. 1.

It will be noted that in the following description any one of the plural virtual machines 30-1, 30-2, 30-3, 30-4 will also simply be called "the virtual machine 30". Furthermore, in the following description any one of the plural BSW programs 40-1, 40-2, 40-3 will also simply be called "the BSW 40". Furthermore, in the following description any one of the control application 60A, the autonomous driving application 60B, and the multimedia application 60C will also simply be called "the application 60".

The virtualization mechanism 20 is realized by software operating on the control system 10. The virtualization mechanism 20 is realized by the plural CPUs 12-1, 12-2, 12-3, 12-4, which are physical configurations of the control system 10. Furthermore, the functions of the virtual machine 30 are realized on the virtualization mechanism 20.

The virtual machine 30 runs on the virtualization mechanism 20. The virtual machine 30 runs as a virtualized computer. The virtual machine 30 can simulate the operation of a computer and act like the hardware of one computer.

The BSW 40 runs on the virtual machine 30. The BSW 40 has basic functions such as an operating system function and a communication function. Specifically, the BSW 40-1 runs on the virtual machine 30-1, the BSW 40-2 runs on the virtual machine 30-3, and the BSW 40-3 runs on the virtual machine 30-4.

The central G/W 50 runs on the virtual machine 30. The central G/W 50 relays data received from the outside.

The application 60 runs on the BSW 40. The application 60 is software that executes certain specific processes. In this embodiment, as shown in FIG. 1, there run the control application 60A, which is an application relating to vehicle control different from autonomous driving control, the autonomous driving application 60B, which is an application relating to autonomous driving control, and the multimedia application 60C, which is an application relating to multimedia utilized in the vehicle.

Specifically, the control application 60A runs on the BSW 40-1, the autonomous driving application 60B runs on the BSW 40-2, and the multimedia application 60C runs on the BSW 40-3.

It will be noted that data requiring a high level of security among data sent from the application 60 to the outside are encrypted by the HSM 14, and then the encrypted data are sent from the application 60 to the outside. Furthermore, encrypted data among data that the application 60 receives from the outside are decrypted by the HSM 14 and are then utilized in the application 60.

For example, data sent and received by the control application 60A are encrypted or decrypted by the HSM 14-1. Furthermore, data sent and received by the autonomous driving application 60B are encrypted or decrypted by the HSM 14-2. Furthermore, data sent and received by the multimedia application 60C are encrypted or decrypted by the HSM 14-3.

If the plural applications 60 shown in FIG. 1 access the storage 18 within a certain predetermined amount of time, competition can occur between the plural CPUs 12-1, 12-2, 12-3, 12-4 and the plural HSMs 14-1, 14-2, 14-3. Specifically, if the CPUs 12 that execute the applications 60 shown in FIG. 1 and the HSMs 14 that execute the encryption or decryption process with respect to data access the memory 16 or the storage 18 within a certain predetermined amount of time, competition can occur between the plural CPUs 12-1, 12-2, 12-3, 12-4 and the plural HSMs 14-1, 14-2, 14-3.

In consideration of this point, for example, a measure can also be taken where a certain application is prioritized without exception over the other applications. However, in such a case, for example, if an application with a high priority level is executed while an application with a low priority level is being executed, the execution of the application with the low priority level ends up being interrupted, and there is also the potential to cause an unexpected operation in the control system 10. Furthermore, in a case where priority levels are set with respect to the applications, if a malfunction occurs in an application whose priority level is high, a situation can also occur where the application with the high priority level ends up continuing to occupy the storage 18.

Therefore, the control system 10 of this embodiment arbitrates, based on the state of the vehicle (hereinafter simply called "the vehicle state"), the order in which data output from the plural applications 60 are stored in the storage 18.

In this embodiment, a control device 22 that runs on the virtualization mechanism 20 receives the vehicle state. The control device 22 also arbitrates, based on the vehicle state and a vehicle state condition representing a condition that is preset in accordance with the vehicle state, the order in which plural sets of data are stored in the storage 18.

It will be noted that the data output from the plural applications 60 include key data for encrypting the data output from the applications 60 and execution data utilized when executing the applications 60. For this reason, the control device 22 also arbitrates, based on the vehicle state and the vehicle state condition, which of the key data and the execution data to prioritize, and store in the storage 18. It will be noted that in the following description the process of storing data in the storage 18 will also simply be called "writing".

Figure 2:
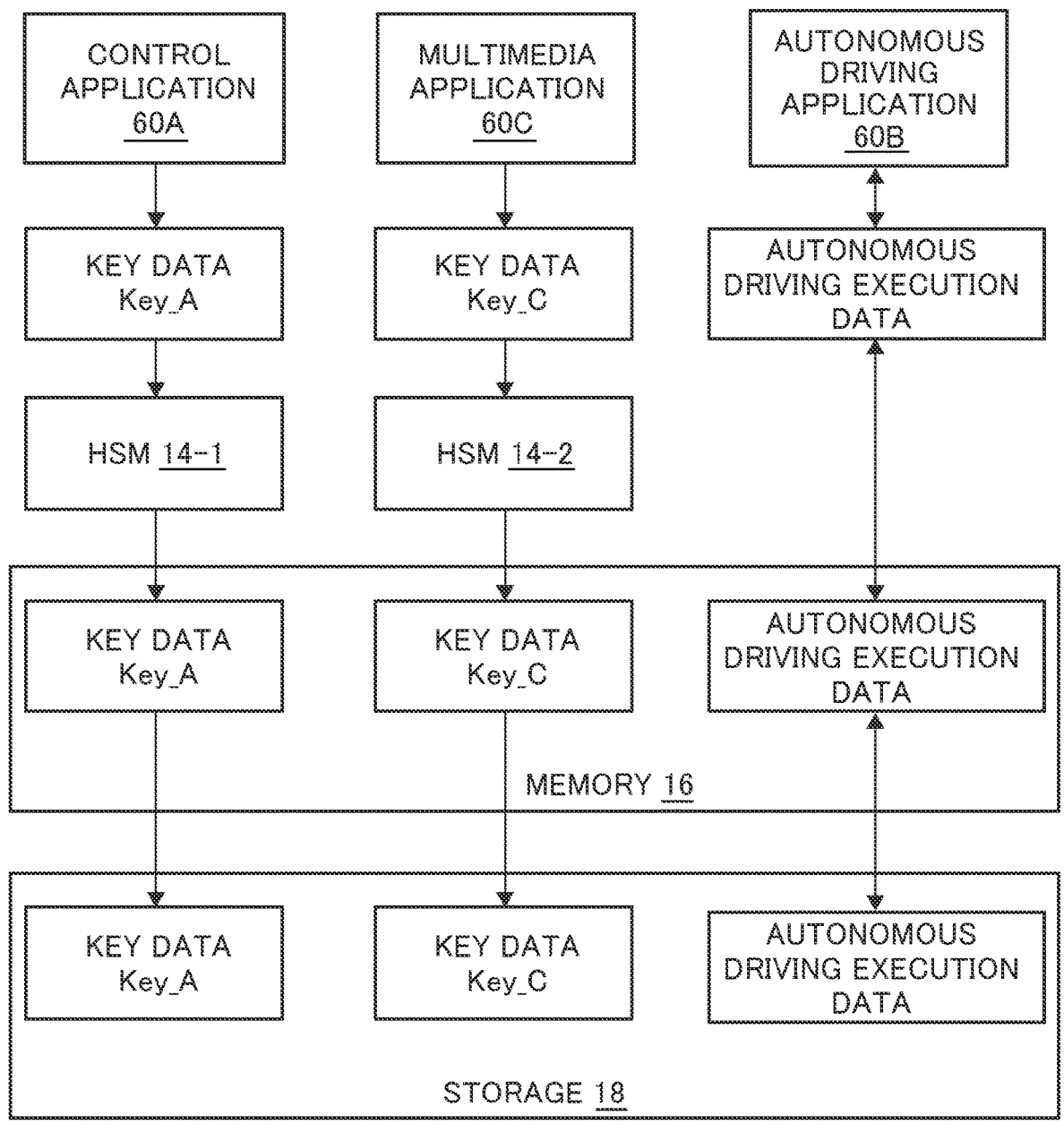
FIG. 2 is a diagram for describing access of a storage by devices.
Figure 3:
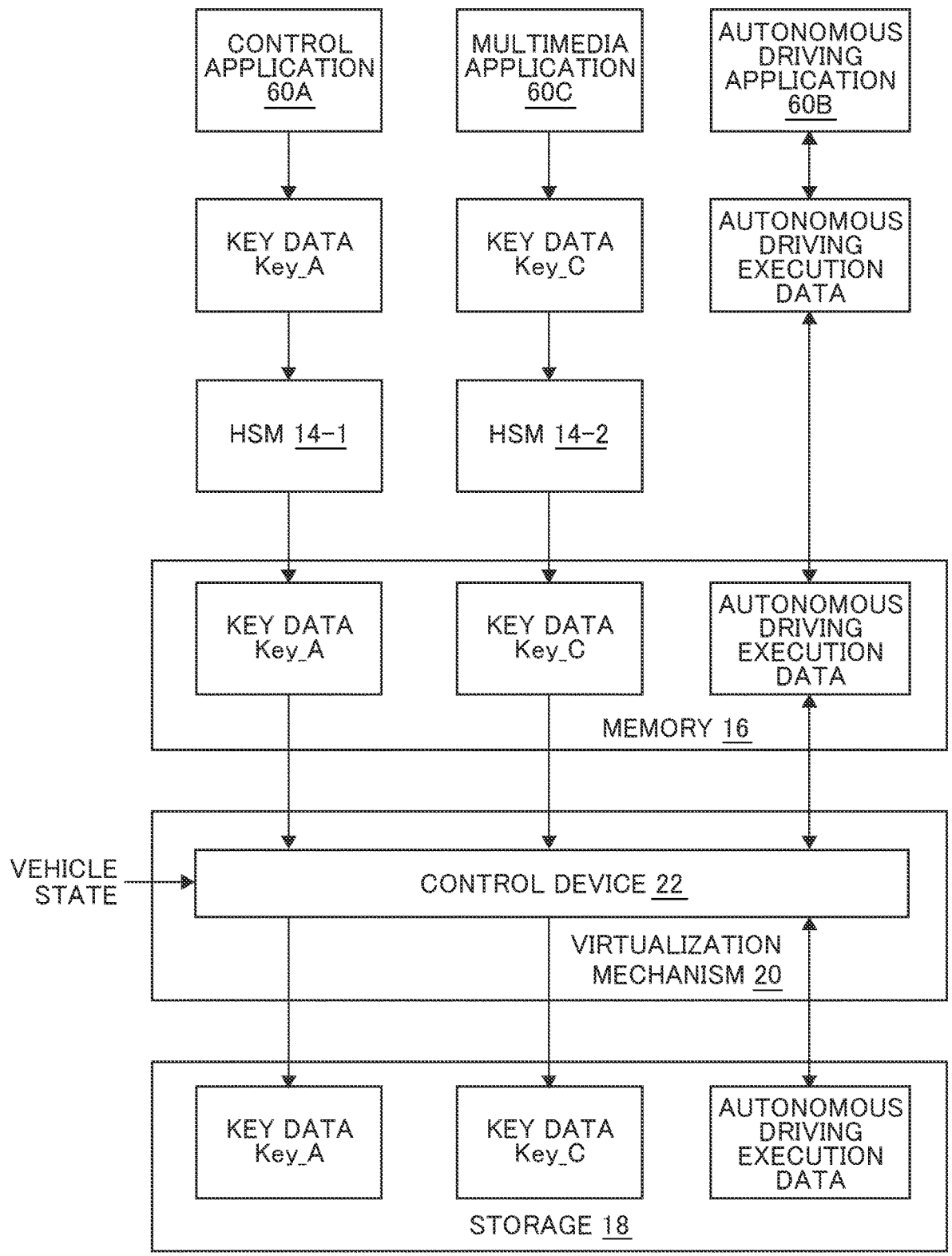
FIG. 3 is a diagram for describing access of the storage by the devices.

FIG. 2 and FIG. 3 are drawings for describing access to the storage 18 by devices.

As shown in FIG. 2, in a case where key data Key_A are output from the control application 60A, the HSM 14-1 acquires the key data Key_A and stores the key data Key_A in its own storage unit (not shown in the drawings). It will be noted that the key data Key_A are utilized to encrypt or decrypt data sent and received between the control application 60A and external devices. The HSM 14-1 first loads the key data Key_A to the memory 16 and then writes the key data Key_A to the storage 18.

Furthermore, as shown in FIG. 2, in a case where key data Key_C are output from the multimedia application 60C, the HSM 14-2 acquires the key data Key_C and stores the key data Key_C in its own storage unit (not shown in the drawings). It will be noted that the key data Key_C are utilized to encrypt or decrypt data sent and received between the multimedia application 60C and external devices. The HSM 14-2 first loads the key data Key_C to the memory 16 and then writes the key data Key_C to the storage 18.

Moreover, as shown in FIG. 2, in a case where execution data relating to autonomous driving are output from the autonomous driving application 60B, the CPU 12 corresponding to the virtual machine 30 running the autonomous driving application 60B first loads the execution data relating to autonomous driving to the memory 16 and then writes the execution data relating to autonomous driving to the storage 18. Furthermore, the CPU 12 corresponding to the virtual machine 30 running the autonomous driving application 60B reads, and outputs to the autonomous driving application 60B, execution data relating to autonomous driving already stored in the storage 18.

When the devices (in the above example, the HSM 14-1, the HSM 14-2, and the CPU 12) related to the applications in their natural course access the storage 18 as described above, competition can occur between the devices. As a result, this can also lead to a state in which various requested performance requirements cannot be met.

For example, in a case where the vehicle is in an autonomous driving mode, there can be cases where the reading of execution data from the storage 18 or the writing of execution data to the storage 18 within a predetermined amount of time is considered a requested performance requirement. Furthermore, for example, in a case where the vehicle is in a vehicle shop mode, there can also be cases where writing key data to the storage 18 in a predetermined amount of time is considered a requested performance requirement.

Therefore, in this embodiment, as shown in FIG. 3, the control device 22 that runs on the virtualization mechanism 20 arbitrates, based on the vehicle state, the vehicle state condition, the type of data, and the type of process, the order in which data are stored in the storage 18 and the order in which data are read from the storage 18.

As shown in FIG. 1, the control device 22 functionally incudes a reception unit 24, a condition storage unit 25, and an arbitration unit 26. The functions of the control device 22 are realized by software.

The reception unit 24 receives the vehicle state of the vehicle in which the control system 10 is installed and the data output from the applications 60.

It will be noted that in this embodiment a case where the vehicle states include an autonomous driving mode indicating that the vehicle is in an autonomous driving mode and a vehicle shop mode indicating that the vehicle is in a service or repair shop and that the vehicle is being serviced or being repaired will be described as an example.

The condition storage unit 25 stores vehicle state conditions representing conditions that are preset in accordance with the vehicle states. The vehicle state conditions are an example of predetermined conditions. In the vehicle state conditions, data processes to be prioritized are preset in accordance with the vehicle states.

FIG. 4 shows an example of the vehicle state conditions. As shown in FIG. 4, in the vehicle state conditions, the vehicle states and priority rankings of processes are associated with each other. For example, as shown in FIG. 4, in a case where the vehicle state is the autonomous driving mode, the priority level of the process of reading the execution data of the autonomous driving application 60B from the storage 18 is the highest and the priority level of the process of writing key data to the storage 18 is the lowest. Furthermore, as shown in FIG. 4, in a case where the vehicle state is the vehicle shop mode, the priority level of the process of writing key data to the storage 18 is the highest and the priority level of the process of reading execution data from the storage 18 is the lowest.

It will be noted that, as shown in FIG. 4, priority levels of processes can also be set in regard to a failure mode indicating a state in which the vehicle has broken down and an over-the-air (OTA) mode indicating a state in which automotive software is being updated.

The arbitration unit 26 arbitrates, based on the vehicle state received by the reception unit 24 and the vehicle state condition stored in the condition storage unit 25, the order in which the plural sets of data output from the plural applications 60 are stored in the storage 18.

Specifically, in a case where the vehicle state received by the reception unit 24 is the autonomous driving mode, the arbitration unit 26 performs control to prioritize, and store in the storage 18, the execution data output from the autonomous driving application 60B over the execution data output from the control application 60A and the execution data output from the multimedia application 60C. It will be noted that, in a case where the vehicle state received by the reception unit 24 is the autonomous driving mode, the arbitration unit 26 performs control to prioritize, and store in the storage 18, the execution data output from the control application 60A over the execution data output from the multimedia application 60C.

Furthermore, in a case where the vehicle state received by the reception unit 24 is not the autonomous driving mode, the arbitration unit 26 performs control to prioritize, and store in the storage 18, the execution data output from the control application 60A over the execution data output from the autonomous driving application 60B and the execution data output from the multimedia application 60C. It will be noted that, in a case where the vehicle state received by the reception unit 24 is not the autonomous driving mode, the arbitration unit 26 performs control to prioritize, and store in the storage 18, the execution data output from the autonomous driving application 60B over the execution data output from the multimedia application 60C.

Furthermore, for example, in a case where the vehicle state received by the reception unit 24 is the vehicle shop mode, the arbitration unit 26 performs control to prioritize, and store in the storage 18, the execution data output from the control application 60A over the execution data output from the autonomous driving application 60B and the execution data output from the multimedia application 60C. Furthermore, for example, in a case where the vehicle state received by the reception unit 24 is the vehicle shop mode, the arbitration unit 26 performs control to prioritize, and store in the storage 18, the execution data output from the autonomous driving application 60B over the execution data output from the multimedia application 60C.

It will be noted that the data output from the plural applications 60 also include key data for encrypting the data output from the applications 60. For this reason, the arbitration unit 26 also arbitrates, based on the vehicle state and the vehicle state condition, which of the key data and the execution data to prioritize, and store in the storage 18.

In a case where the vehicle state received by the reception unit 24 is the vehicle shop mode, the arbitration unit 26 performs control to prioritize the process of storing the key data in the storage 18 over the process of storing the execution data in the storage 18. Furthermore, in a case where the vehicle state received by the reception unit 24 is the autonomous driving mode, the arbitration unit 26 performs control to prioritize the process of reading data from the storage 18 over the process of storing the key data in the storage 18.

In this way, the arbitration unit 26 arbitrates the order in which the plural sets of data are stored in the storage 18 and the order in which data are read from the storage 18.

It will be noted that in the example shown in FIG. 1, four virtual machines 30 are shown, three BSW programs 40 are shown, and three applications 60 are shown. Furthermore, in the example shown in FIG. 1, four CPUs 12 and three HSMs 14 are shown. However, the numbers of these constituent elements are not limited to the examples shown in FIG. 1.

Next, the action of the control system 10 of the embodiment will be described.

Figure 5:
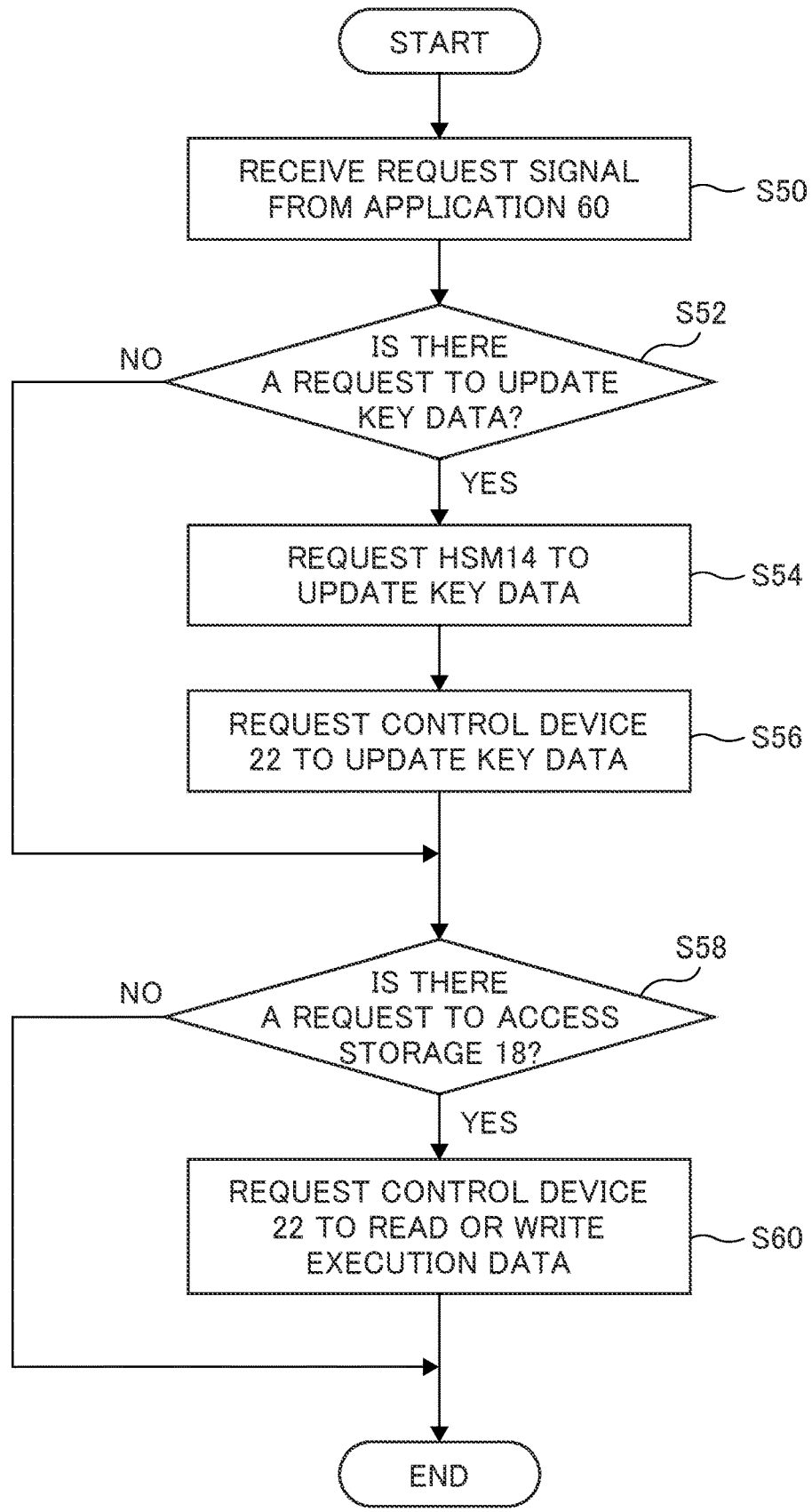
FIG. 5 is a flowchart showing an example of a flow of processes performed by the control system pertaining to the embodiment.

When the virtual machine 30 realized by the CPU 12 of the control system 10 receives a request signal output from the application 60, the CPU 12 realizing the virtual machine 30 executes the control process routine shown in FIG. 5.

In step S50 the CPU 12 receives the request signal output from the application 60.

In step S52 the CPU 12 determines whether or not the request signal received in step S50 includes a request to update the key data. In a case where the request signal includes a request to update the key data, the CPU 12 proceeds to step S54. In a case where the request signal does not include a request to update the key data, the CPU 12 proceeds to step S58.

In step S54 the CPU 12 requests the HSM 14 to update the key data.

When the HSM 14 receives the update request output from the CPU 12, the HSM 14 stores the key data in its own storage unit (not shown in the drawings).

In step S56 the CPU 12 requests the control device 22 to update the key data.

In step S58 the CPU 12 determines whether or not the request signal received in step S50 includes a request to access the storage 18. In a case where the request signal includes a request to access the storage 18, the CPU 12 proceeds to step S60. In a case where the request signal does not include a request to access the storage 18, the CPU 12 ends the process.

In step S60 the CPU 12 requests the control device 22 to read the execution data from the storage 18 or write the execution data to the storage 18.

Figure 6:
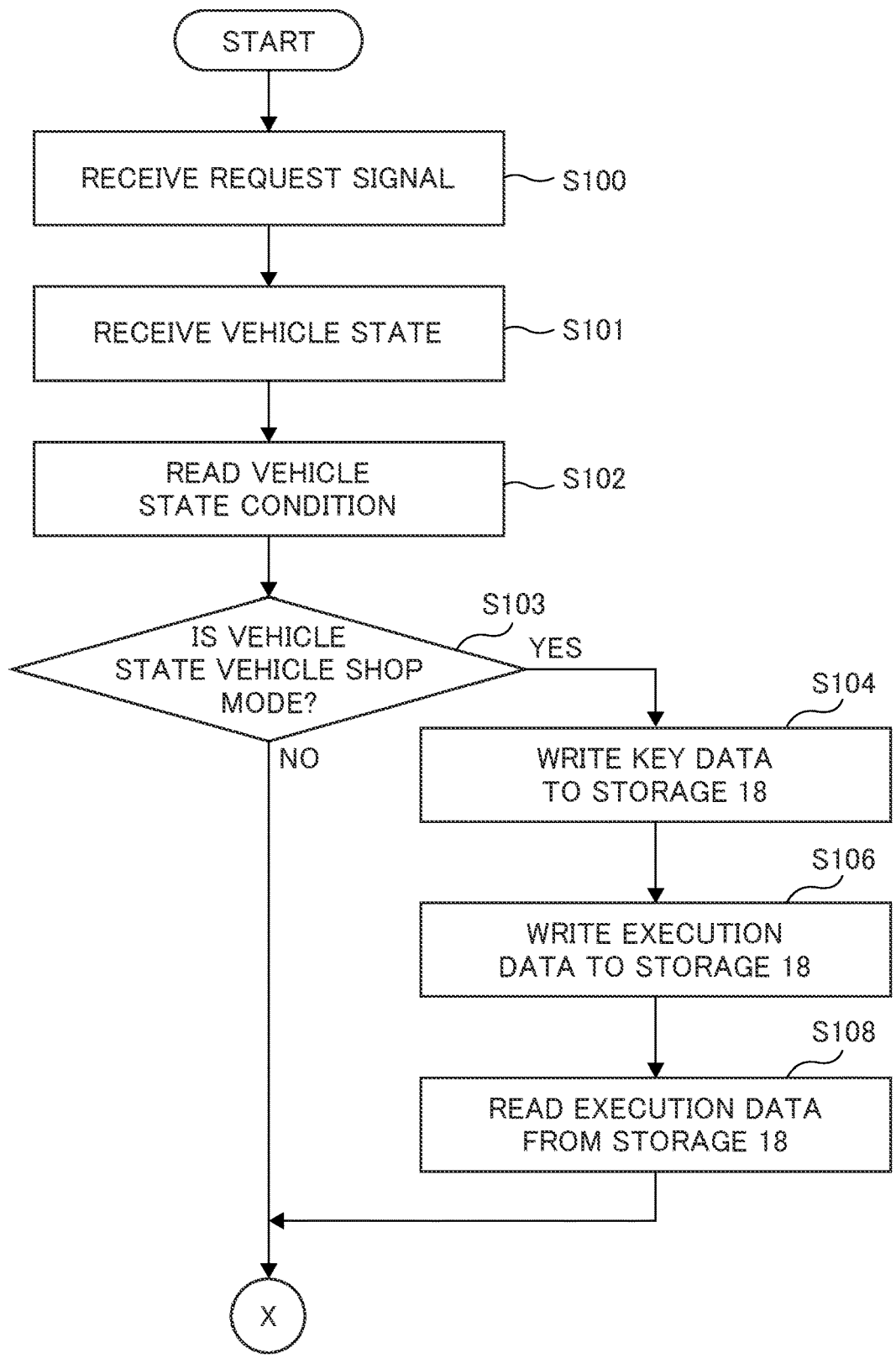
FIG. 6 is a flowchart showing an example of a flow of processes performed by the control system pertaining to the embodiment.

When a signal requesting the respective process is output to the control device 22 in step S56 or step S60, the CPU 12 corresponding to the control device 22 executes the control process routine shown in FIG. 6 and FIG. 7.

In step S100 of FIG. 6 the CPU 12, as the reception unit of the control device 22, receives the request signal output in step S56 or step S60.

In step S101 the CPU 12, as the reception unit 24 of the control device 22, receives the current vehicle state.

In step S102 the CPU 12, as the arbitration unit 26 of the control device 22, reads the vehicle state condition from the condition storage unit 25.

In step S103 the CPU 12, as the arbitration unit 26 of the control device 22, determines whether or not the vehicle state received in step S101 is the vehicle shop mode. In a case where the vehicle state is the vehicle shop mode, the CPU 12 proceeds to step S104. In a case where the vehicle state is not the vehicle shop mode, the CPU 12 proceeds to step S110 shown in FIG. 7.

The CPU 12, as the arbitration unit 26 of the control device 22, references the vehicle state condition read in step S102 and executes processes in the order of step S104 to step S108.

In step S104 the CPU 12, as the arbitration unit 26 of the control device 22, writes to the storage 18 the key data output from the application 60.

In step S106 the CPU 12, as the arbitration unit 26 of the control device 22, writes to the storage 18 the execution data output from the application 60.

In step S108 the CPU 12, as the arbitration unit 26 of the control device 22, reads the execution data from the storage 18 in accordance with the request from the application 60.

In this way, in a case where the vehicle is in the vehicle shop mode, the situation is one where upgrades or repairs are made to the vehicle, and it is necessary to make various settings with respect to the vehicle smooth. For this reason, in a case where the vehicle is in the vehicle shop mode, the priority level of the process of writing various types of data to the storage 18 is set high. In particular, the priority level of the process of writing the key data to the storage 18 is set the highest. It will be noted that, as shown in the processes of step S104 to step S108, in a case where the vehicle is in the vehicle shop mode, the type of the application 60 is not considered.

Next, in step S110 of FIG. 7 the CPU 12, as the arbitration unit 26 of the control device 22, determines whether or not the vehicle state received in step S101 is the autonomous driving mode. In a case where the vehicle state is the autonomous driving mode, the CPU 12 proceeds to step S112. In a case where the vehicle state is not the autonomous driving mode, the CPU 12 proceeds to step S120.

In step 112 the CPU 12, as the arbitration unit 26 of the control device 22, reads the execution data from the storage 18 in accordance with a request from the autonomous driving application 60B. Then, the CPU 12, as the arbitration unit 26 of the control device 22, hands over the execution data it has read to the autonomous driving application 60B.

In step S114 the CPU 12, as the arbitration unit 26 of the control device 22, writes to the storage 18 the execution data output from the autonomous driving application 60B.

In step S116 the CPU 12, as the arbitration unit 26 of the control device 22, reads the execution data from the storage 18 in accordance with a request from the control application 60A. Then, the CPU 12, as the arbitration unit 26 of the control device 22, hands over the execution data it has read to the control application 60A.

In step S118 the CPU 12, as the arbitration unit 26 of the control device 22, writes to the storage 18 the execution data output from the control application 60A.

In this way, in a case where the vehicle state is the autonomous driving mode, various processes with respect to data relating to the autonomous driving application 60B are prioritized.

In step S120 the CPU 12, as the arbitration unit 26 of the control device 22, reads the execution data from the storage 18 in accordance with a request from the control application 60A. Then, the CPU 12, as the arbitration unit 26 of the control device 22, hands over the execution data it has read to the control application 60A.

In step S122 the CPU 12, as the arbitration unit 26 of the control device 22, writes to the storage 18 the execution data output from the control application 60A.

In step S124 the CPU 12, as the arbitration unit 26 of the control device 22, reads the execution data from the storage 18 in accordance with a request from the autonomous driving application 60B. Then, the CPU 12, as the arbitration unit 26 of the control device 22, hands over the execution data it has read to the autonomous driving application 60B.

In step S126 the CPU 12, as the arbitration unit 26 of the control device 22, writes to the storage 18 the execution data output from the autonomous driving application 60B.

In this way, in a case where the vehicle is not in the autonomous driving mode, various processes with respect to data relating to the control application 60A are prioritized over various processes with respect to data relating to the autonomous driving application 60B.

In step S128 the CPU 12, as the arbitration unit 26 of the control device 22, reads the execution data from the storage 18 in accordance with a request from the multimedia application 60C. Then, the CPU 12, as the arbitration unit 26, hands over the execution data it has read to the multimedia application 60C.

In step S130 the CPU 12, as the arbitration unit 26 of the control device 22, writes to the storage 18 the execution data output from the multimedia application 60C.

In this way, in both a case where the vehicle state is the autonomous driving mode and a case where the vehicle state is not the autonomous driving mode, various processes with respect to data relating to the control application 60A and the autonomous driving application 60B are prioritized over various processes with respect to data relating to the multimedia application 60C.

In step S132 the CPU 12, as the arbitration unit 26 of the control device 22, writes to the storage 18 the key data output from the application 60.

In this way, in a case where the vehicle state is not the vehicle shop mode, various processes with respect to data relating to the application 60 are prioritized over the process of writing the key data to the storage 18.

It will be noted that, in the control process routine shown in FIG. 6 and FIG. 7, there are also cases where the control device 22 omits any of the processes of step S104 to step S108 are omitted depending on the request signal received in step S100. Furthermore, there are also cases where the control device 22 omits any of the processes of step S112 to step S132 depending on the request signal received in step S100.

For example, in a case where the request signal does not include a request to update the key data, the processes of step S104 and step S132 are omitted. Furthermore, for example, in a case where the request signal does not include a request to access the storage 18, the processes of step S106 to step S108 and step S112 to step S130 are omitted.

Furthermore, in a case where the request signal does not include a request to process data relating to a specific application 60, processes relating to that application 60 are omitted. For example, in a case where the request signal does not include a request to process data relating to the control application 60A, the processes of step S116 to step S118 and step S120 to step S122 are omitted.

As described above, the control device pertaining to the embodiment receives data output from plural applications and arbitrates, based on predetermined conditions, the order in which the plural sets of data output from the plural applications are stored in a storage. Because of this, even in a case where plural devices related to the plural applications access one storage unit, the occurrence of competition between the devices can be inhibited.

Furthermore, the vehicle state conditions described above can be freely set, so the priority levels of the processes can be flexibly set. Furthermore, according to the control device pertaining to this embodiment, the priority levels of the processes can also be flexibly set in accordance with requested performance requirements.

It will be noted that although the processes performed by the devices in the above embodiment were described as software processes performed by executing programs, the processes may also be performed by hardware. Alternatively, the processes may also combine both software and hardware. Furthermore, the programs stored in the read only memory (ROM) may be stored in various types of storage media and circulated.

Moreover, the disclosure is not limited to the above embodiment and, in addition to the above embodiment, can be modified in various ways and implemented in a range that does not depart from the spirit thereof.

In this embodiment, a case where the vehicle states include the autonomous driving mode and the vehicle shop mode was described as an example, but the vehicle states are not limited to this. Priority levels of processes may also be set in regard to a manual driving mode indicating that the vehicle is in a manual driving state, a failure mode indicating a state in which the vehicle has broken down, and an over-the-air (OTA) mode indicating a state in which automotive software is being updated.

Furthermore, in this embodiment, a case where the plural applications include the control application 60A, the autonomous driving application 60B, and the multimedia application 60C was described as an example, but the plural applications are not limited to this, and other applications may also be applied to this embodiment.

All publications, patent applications, and technical standards mentioned in this specification are herein incorporated by reference to the same extent as if each individual publication, patent application, or technical standard was specifically and individually indicated to be incorporated by reference.

What is claimed is:

1. A control device comprising a memory and a processor coupled to the memory, the processor being configured to:
   receive data output from plural applications; and
   arbitrate, based on predetermined conditions, an order in which plural sets of the data output from the plural applications are stored in the memory, wherein
   the predetermined conditions are vehicle state conditions representing conditions that are preset in accordance with vehicle states, and
   the processor is configured to further receive a vehicle state and arbitrate, based on the vehicle state and the vehicle state conditions, the order in which the plural sets of data that have been received are stored in the memory.

2. The control device of claim 1, wherein:
the plural applications include an autonomous driving application that is an application relating to autonomous driving control and a control application that is an application relating to vehicle control that is different from the autonomous driving control,
the vehicle states include an autonomous driving mode indicating that the vehicle is in an autonomous driving state, and
the processor arbitrates the order in which the plural sets of data are stored in the memory in such a way that, in a case in which the vehicle state that has been received is the autonomous driving mode, the processor prioritizes, and stores in the memory, data output from the autonomous driving application over data output from the control application and, in a case in which the vehicle state that has been received is not the autonomous driving mode, the processor prioritizes, and stores in the memory, the data output from the control application over the data output from the autonomous driving application.

3. The control device of claim 2, wherein:
the plural applications further include a multimedia application that is an application relating to multimedia utilized in the vehicle, and
the processor arbitrates the order in which the plural sets of data are stored in the memory in such a way that, in a case in which the vehicle state that has been received is the autonomous driving mode, the processor prioritizes, and stores in the memory, the data output from the autonomous driving application over the data output from the control application and data output from the multimedia application and, in a case in which the vehicle state that has been received is not the autonomous driving mode, the processor prioritizes, and stores in the memory, the data output from the control application and the data output from the autonomous driving application over the data output from the multimedia application.

4. The control device of claim 2, wherein:
the vehicle states include a vehicle shop mode indicating that the vehicle is in a service or repair shop and that the vehicle is being serviced or being repaired, and
the processor arbitrates the order in which the plural sets of data are stored in the memory in such a way that, in a case in which the vehicle state that has been received is the vehicle shop mode, the processor prioritizes, and stores in the memory, the data output from the control application over the data output from the autonomous driving application.

5. The control device of claim 4, wherein the processor further arbitrates the order in which the plural sets of data are stored in the memory and an order in which data are read from the memory in such a way that, in a case in which the vehicle state that has been received is the vehicle shop mode, the processor prioritizes a process of storing the data output from the applications in the memory over a process of reading data from the memory and, in a case in which the vehicle state that has been received is the autonomous driving mode, the processor prioritizes the process of reading data from the memory over the process of storing the data output from the applications in the memory.

6. A vehicle including the control device of claim 1.

7. A control device comprising a memory and a processor coupled to the memory, the processor being configured to:
receive data output from plural applications; and
arbitrate, based on predetermined conditions, an order in which plural sets of the data output from the plural applications are stored in the memory;
wherein:
the data output from the plural applications include key data for encrypting the data output from the applications and execution data utilized when executing the applications, and
the processor arbitrates, based on the predetermined conditions, which of the key data and the execution data to prioritize and store in the memory;
the predetermined conditions are vehicle state conditions representing conditions that are preset in accordance with vehicle states,
the processor further receives a vehicle state,
the vehicle states include an autonomous driving mode indicating that the vehicle is in an autonomous driving state and a vehicle shop mode indicating that the vehicle is in a service or repair shop and that the vehicle is being serviced or being repaired, and
the processor further arbitrates the order in which the plural sets of data are stored in the memory and an order in which data are read from the memory in such a way that, in a case in which the vehicle state that has been received is the vehicle shop mode, the processor prioritizes a process of storing the key data in the memory over a process of storing the execution data in the memory and, in a case in which the vehicle state that has been received is the autonomous driving mode, the processor prioritizes a process of reading the execution data from the memory over the process of storing the key data in the memory.

8. A control method whereby a processor:
receives data output from plural applications; and
arbitrates, based on predetermined conditions, an order in which plural sets of the data output from the plural applications are stored in a storage unit, wherein
the predetermined conditions are vehicle state conditions representing conditions that are preset in accordance with vehicle states, and
the processor further receives a vehicle state and arbitrate, based on the vehicle state and the vehicle state conditions, the order in which the plural sets of data that have been received are stored in the memory.

9. A non-transitory recording medium storing a control program executable by a processor to:
receive data output from plural applications; and
arbitrate, based on predetermined conditions, an order in which plural sets of the data output from the plural applications are stored in a storage unit;
wherein:
the data output from the plural applications include key data for encrypting the data output from the applications and execution data utilized when executing the applications, and
the program is further executable by the processor to arbitrate, based on the predetermined conditions, which of the key data and the execution data to prioritize and store in the memory;
the predetermined conditions are vehicle state conditions representing conditions that are preset in accordance with vehicle states,
the program is further executable by the processor to receive a vehicle state,
the vehicle states include an autonomous driving mode indicating that the vehicle is in an autonomous driving state and a vehicle shop mode indicating that the vehicle is in a service or repair shop and that the vehicle is being serviced or being repaired, and the program is further executable by the processor to arbitrate the order in which the plural sets of data are stored in the memory and an order in which data are read from the memory in such a way that, in a case in which the vehicle state that has been received is the vehicle shop mode, the processor prioritizes a process of storing the key data in the memory over a process of storing the execution data in the memory and, in a case in which the vehicle state that has been received is the autonomous driving mode, the processor prioritizes a process of reading the execution data from the memory over the process of storing the key data in the memory.

10. A control method whereby a processor:

receives data output from plural applications; and arbitrates, based on predetermined conditions, an order in which plural sets of the data output from the plural applications are stored in a storage unit;

wherein:

the data output from the plural applications include key data for encrypting the data output from the applications and execution data utilized when executing the applications, and the program is further executable by the processor to arbitrate, based on the predetermined conditions, which of the key data and the execution data to prioritize and store in the memory;

the predetermined conditions are vehicle state conditions representing conditions that are preset in accordance with vehicle states, the program is further executable by the processor to receive a vehicle state, the vehicle states include an autonomous driving mode indicating that the vehicle is in an autonomous driving state and a vehicle shop mode indicating that the vehicle is in a service or repair shop and that the vehicle is being serviced or being repaired, and the program is further executable by the processor to arbitrate the order in which the plural sets of data are stored in the memory and an order in which data are read from the memory in such a way that, in a case in which the vehicle state that has been received is the vehicle shop mode, the processor prioritizes a process of storing the key data in the memory over a process of storing the execution data in the memory and, in a case in which the vehicle state that has been received is the autonomous driving mode, the processor prioritizes a process of reading the execution data from the memory over the process of storing the key data in the memory.

11. A non-transitory recording medium storing a control program executable by a processor to:

receive data output from plural applications; and arbitrate, based on predetermined conditions, an order in which plural sets of the data output from the plural applications are stored in a storage unit, wherein the predetermined conditions are vehicle state conditions representing conditions that are preset in accordance with vehicle states, and the processor further receives a vehicle state and arbitrate, based on the vehicle state and the vehicle state conditions, the order in which the plural sets of data that have been received are stored in the memory.

* * * * *